(12) United States Patent  
Tidestav

(10) Patent No.: US 8,270,500 B2  
(45) Date of Patent: Sep. 18, 2012

(54) METHOD OF SELECTING A MODULATION AND CODING SCHEME BASED ON ADJUSTED CHANNEL QUALITY VALUES

(75) Inventor: Claes Tidestav, Balsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 142 days.

(21) Appl. No.: 12/740,517

(22) PCT Filed: Dec. 10, 2007

(86) PCT No.: PCT/SE2007/050964  
§ 371 (c)(1),  
(2), (4) Date: Apr. 29, 2010

(87) PCT Pub. No.: WO2009/075617  
PCT Pub. Date: Jun. 18, 2009

(65) Prior Publication Data  
US 2010/0232526 A1     Sep. 16, 2010

(51) Int. Cl.  
*H04L 27/00* (2006.01)
(52) U.S. Cl. .............. 375/259; 370/252; 455/68; 455/69
(58) Field of Classification Search .................. 375/259, 375/295; 370/252; 455/68, 69  
See application file for complete search history.

(56) References Cited

U.S. PATENT DOCUMENTS

2005/0170782 A1 *  8/2005  Rong et al. ................. 455/67.11
2005/0181811 A1 *  8/2005  Magnusson et al. .......... 455/458
2005/0250540 A1 * 11/2005  Ishii et al. .................... 455/561

FOREIGN PATENT DOCUMENTS

| EP | 1 463 230 A2 | 9/2004 |
| EP | 1 589 715 A1 | 10/2005 |
| WO | WO 2006/118892 A1 | 11/2006 |

OTHER PUBLICATIONS

International Search Report dated Oct. 23, 2008 (3 pages).  
International Preliminary Report on Patentability dated Mar. 25, 2010 (10 pages).

* cited by examiner

*Primary Examiner* — Curtis Odom  
(74) *Attorney, Agent, or Firm* — Myers Bigel Sibley & Sajovec, P.A.

(57) ABSTRACT

In a method for selecting modulation and coding scheme for data transmitted from a transmitter to a receiver, the transmitter determines an estimated channel quality value. The transmitter then adjusts the estimated channel quality value in relation to a distribution of estimated channel quality values, and selects modulation and coding scheme based on the adjusted channel quality value. The invention also extends to a transmitter and a computer program product configured to select modulation and coding scheme accordingly.

11 Claims, 7 Drawing Sheets

METHOD OF SELECTING A MODULATION AND CODING SCHEME BASED ON ADJUSTED CHANNEL QUALITY VALUES

TECHNICAL FIELD

The present invention relates to a method and a device for selecting Modulation and Coding Scheme (MCS) when transmitting data from a transmitter to a receiver.

BACKGROUND

Link adaptation is a fundamental technique in modern mobile communication systems. With link adaptation, the channel coding rate and modulation scheme is typically chosen based on so-called Channel Quality Index (CQI) reports. These CQI reports are derived at the receiver to reflect channel quality and interference levels, and subsequently transmitted over a signaling channel.

As an alternative, the CQI reports can be estimated directly at the transmitter, based on the quality of the transmissions received from the intended receiver.

The CQI reports are then used as a basis to select the channel coding rate and modulation scheme to transmit as much user data as possible using as little resources as possible. This is achieved by predicting the resulting block-error probability (BLEP) for each possible modulation and coding scheme (MCS). That is for each combination of modulation and channel coding the resulting BLEP is calculated and the currently best MCS is then selected based on the outcome of those calculations. If the channel quality reports provide an accurate measure of the channel quality at the transmission instant, it becomes possible to maintain tight control over the BLEP when transmitting a data stream.

For several reasons however, the channel quality during transmission is different from the channel quality indicated by the CQI reports. At least three factors will cause the actual channel quality to deviate from the channel quality in the CQI reports:

The CQI reports are old, i.e. the channel and/or interference levels may have changed since the measurement.
Estimation errors.
The CQI reports are quantized.

These inaccuracies are well-known and attempts have been made to reduce them. Although successful to some extent, the improved estimation methods leave significant inaccuracies in the CQI estimates resulting in that the non-optimal modulation and coding scheme is selected for transmission.

Hence, there exist a need for an improved method and system for determining the modulation and coding scheme based on a channel quality value such as a CQI report.

SUMMARY

It is an object of the present invention to overcome or at least reduce some of the problems associated with prior art systems for determining a modulation and coding scheme based on a channel quality value.

This object and others are obtained by the method, transmitter and computer program product as set out in the appended claims. Thus, by realizing that the CQI report or any other channel quality value is not accurate and instead of treating the values relating to a reported channel quality as if they were true, the channel quality values are treated as stochastic variables with a certain distribution a better selection of coding and modulation scheme can be achieved. Hence, the link adaptation is based on link measurement results that take the distribution of the channel quality values into account.

In accordance with the invention a method is provided for selecting modulation and coding scheme for data transmitted from a transmitter to a receiver wherein the transmitter determines an estimated channel quality value. The transmitter then adjusts the estimated channel quality value in relation to a distribution of estimated channel quality values, and selects modulation and coding scheme based on the adjusted channel quality value.

The invention also extends to a transmitter and a computer program product configured to select modulation and coding scheme accordingly.

In accordance with one embodiment, the distribution of the channel quality values, such as CQI reports, can be assumed to be known a priori, which is true for the quantization error.

In accordance with one embodiment the distribution of the channel quality values, such as CQI reports, is estimated based on data related to a particular transmitter transmitting on a particular link.

Using the modulation and coding scheme selection method in accordance with the invention will provide an improved selection of modulation and coding scheme whereby the resulting Block Error Rate (BLER) will better correspond to the block error probability which the transmitter aims at reaching. This in turn provides a more efficient transmitter that needs to utilize less resources.

BRIEF DESCRIPTION OF THE DRAWINGS

The present invention will now be described in more detail by way of non-limiting examples and with reference to the accompanying drawings, in which.

DETAILED DESCRIPTION

Figure 1:
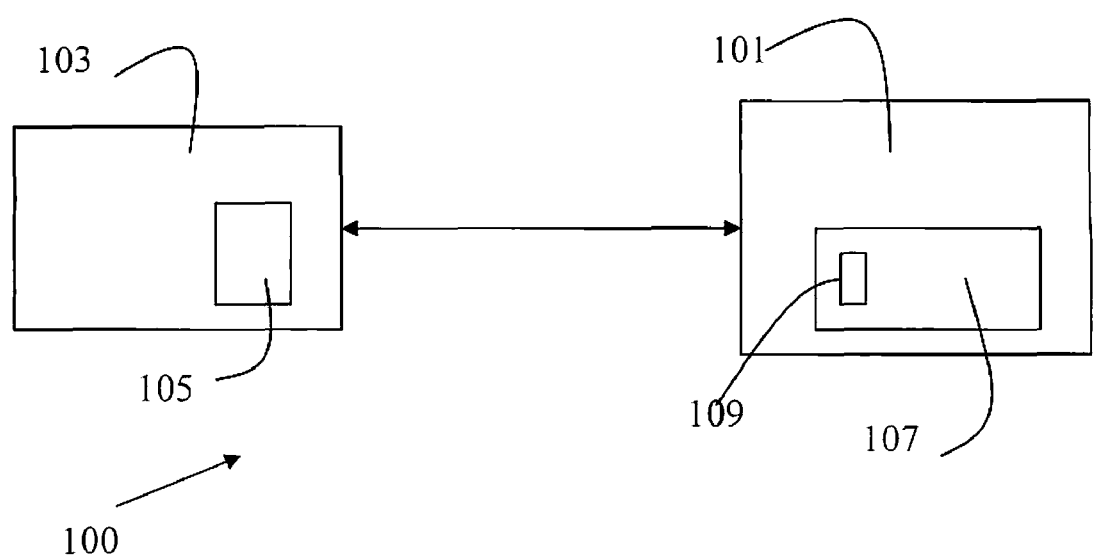
FIG. 1 is a view of a transmission system for transmitting data from a transmitter to a receiver.

In FIG. 1 a view of a transmission system 100 is shown. The system 100 comprises a transmitter 101 and a receiver 103. The system 100 is configured to employ a channel quality value, such as a Channel Quality Index (CQI) report, for selecting Modulation and Coding Scheme (MCS) when determining how to transmit data from the transmitter 101 to the receiver 103. The system 100 can typically be a cellular radio system such as a Wideband Code Division Multiple Access (WCDMA) system or any other cellular radio system. The transmitter 101 can be a radio base station and the receiver can be a User Equipment (UE) communicating over a radio interface with the radio base station. The receiver is further provided with a unit 105 for generation of a channel quality value such as a Channel Quality Index (CQI) report based on the quality of data received from the transmitter 101 over the channel between the transmitter and the receiver. The unit 105 is further configured to send the CQI reports back to the transmitter 101. The transmitter 101 is provided with a unit 107 for processing received CQI reports and for selecting a suitable Modulation and Coding Scheme (MCS) based on the received CQI reports. The processing of received CQI reports from the receiver 103 can be performed in accordance with different methods. The method used can typically be programmed and stored on a computer program product 109 loadable into the unit 107.

In conventional cellular radio systems the CQI estimates are used as accurate. The underlying assumption is that if the CQI estimates are correct on average, the link adaptation will work well on average, i.e., the Block error probability (BLEP) will be correctly predicted on average. In other words, it is acknowledged that the BLEP for a certain transmission is not as it should have been predict from the CQI report, since an individual CQI report is inaccurate. However, because many Modulation and Coding Scheme (MCS) selections are made, the average block error probability for all these transmissions will equal the average block error probability predicted from the CQI reports.

However, this has been found to not be true. Hence, although the CQI reports are unbiased estimates of the channel quality, the resulting average block error probability will differ from the block error probability predicted from the CQI report. Expressed in mathematical terms:

$$E[BLEP(C\hat{Q}I)] \neq BLEP(E[C\hat{Q}I])$$

where $E[x]$ denotes the expected value of x.

To exemplify, consider the link adaptation in High Speed Downlink Packet Access (HSDPA) when 10 HS-PDSCH codes are available. Assume that it is determined to evaluate the resulting average BLEP when the link adaptation targets a 10% BLEP for the transport block sizes supported by the standard. Assume further that only the CQI inaccuracy caused by quantization effects is taken into account.

Figure 2:
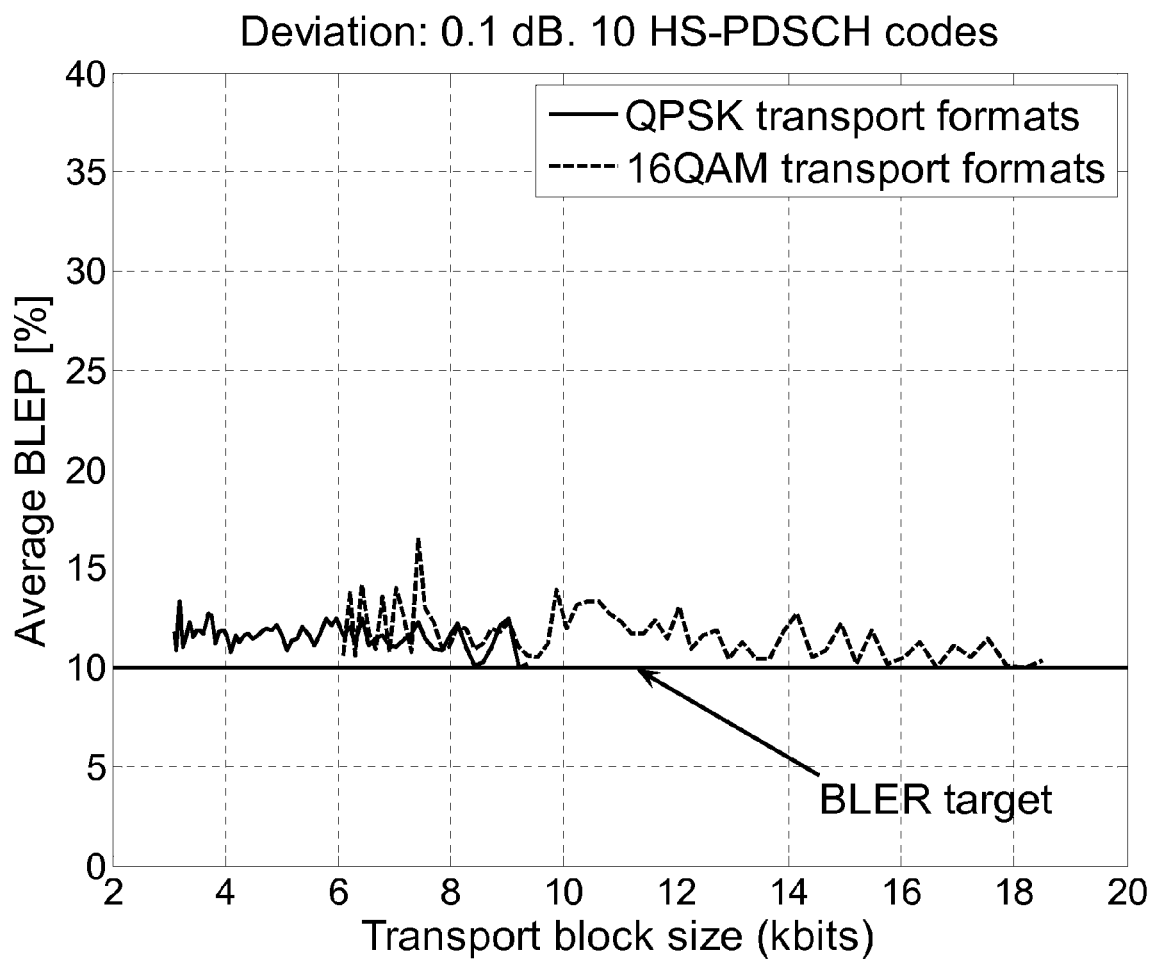
FIG. 2 is a view of the resulting BLEP for a first transmission scenario for different MCSs.

Consider a quantization of 0.1 dB. This means that the quantization error is uniformly distributed between −0.05 dB and 0.05 dB. (Note that the quantization in HSDPA is 1 dB.) In the example given the CQI reports are thus relatively accurate. The result is shown in FIG. 2. As is clearly seen in FIG. 2, the link adaptation works as intended with accurate CQI reports with the resulting average BLEP is close to the target BLEP, i.e. close to 10%.

Now, the same scenario is investigated, but the quantization is increased to the level that is actually in the standard: i.e. 1 dB, resulting in a quantization error that is uniformly distributed between −0.5 dB and 0.5 dB. The result is shown in FIG. 3.

Figure 3:
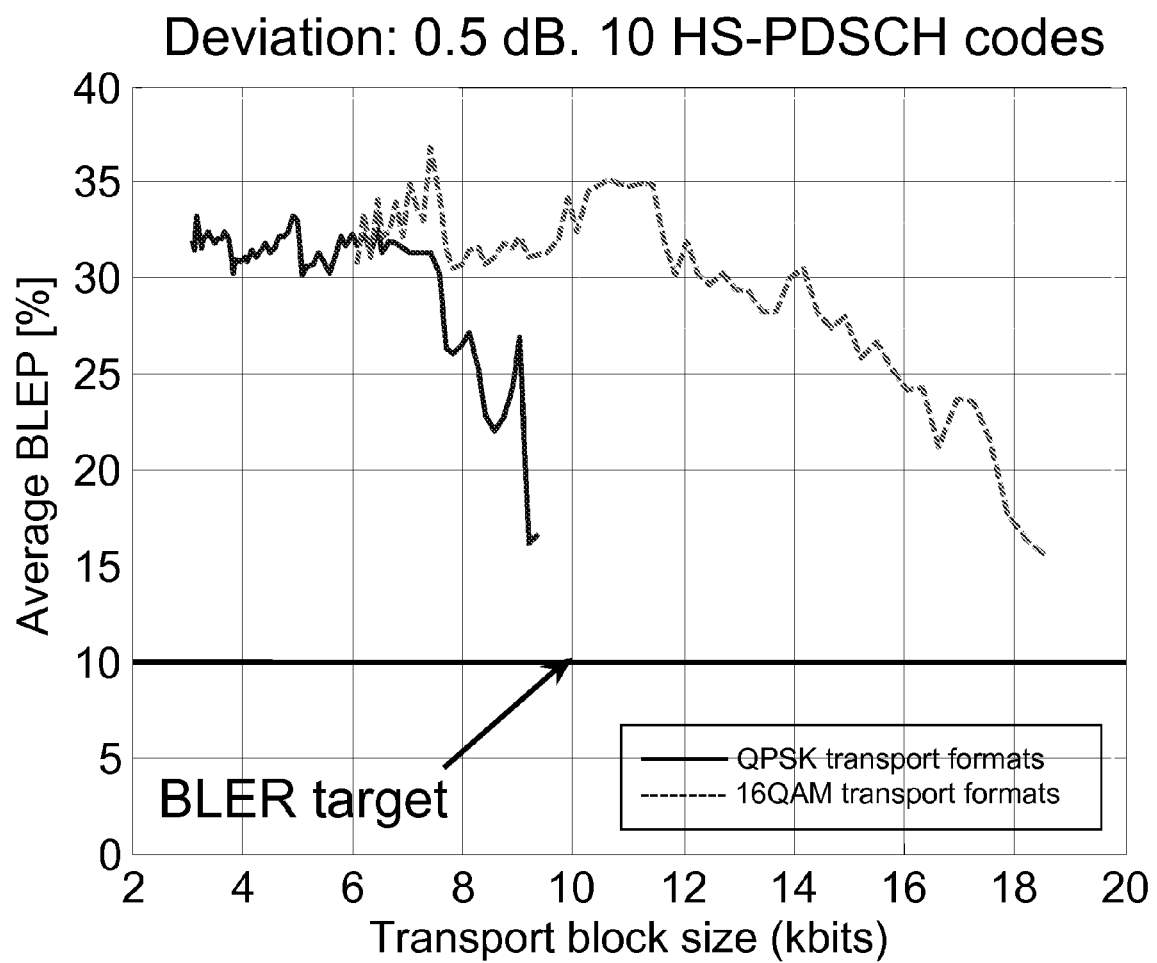
FIG. 3 is a view of the resulting BLEP for a second transmission scenario for different MCSs.

From FIG. 3 it is clear that the difference between the target BLEP and the resulting BLEP is significant. In fact for the majority of the MCSs, the resulting BLEP is around 30% compared to the target BLEP of 10%. Only for the largest transport blocks, it approaches the 10% target.

Figure 4:
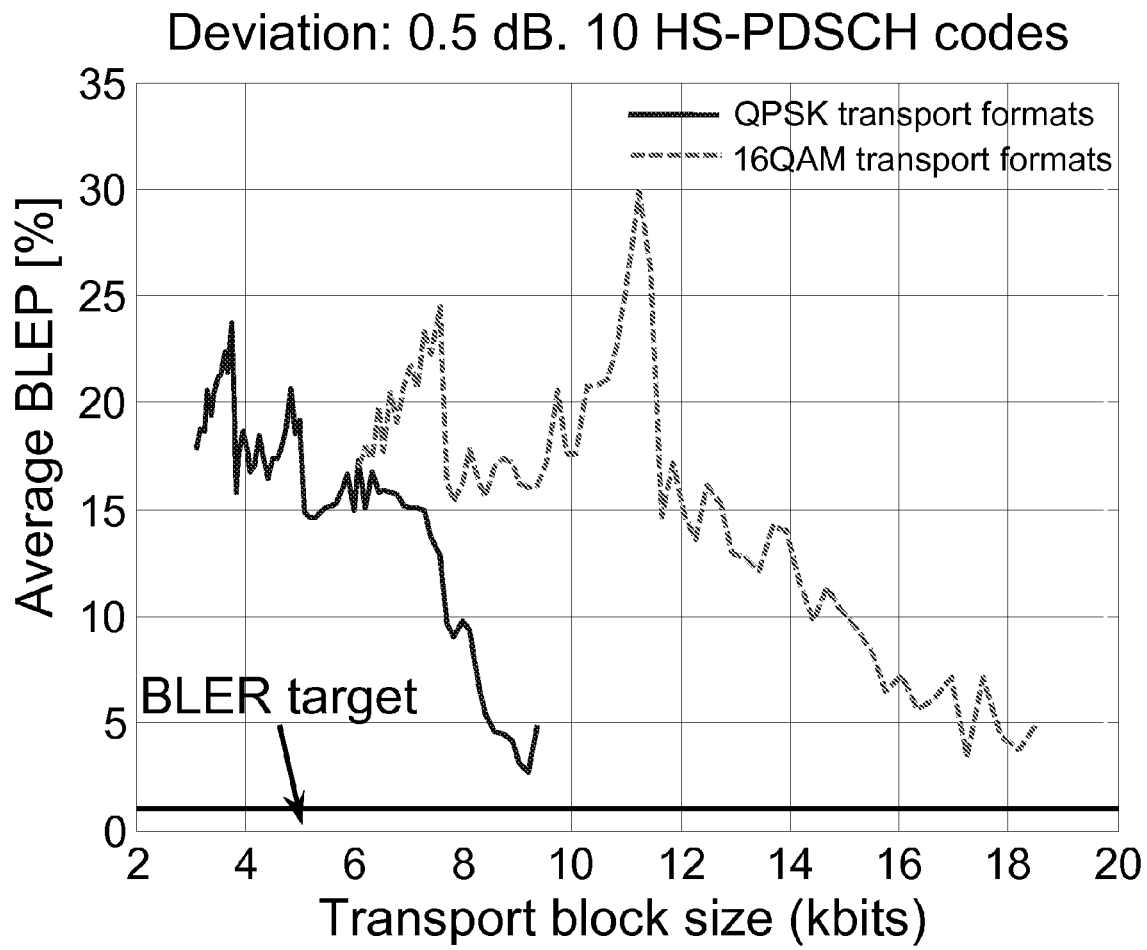
FIG. 4 is a view of the resulting BLEP for a third transmission scenario for different MCSs.

The situation illustrated above in conjunction with FIG. 3 becomes even worse when the target is reduced to 1%, as depicted in FIG. 4. If as depicted in FIG. 4 the aim is a BLEP of 1%, the use the CQI reports as if they were true will result in average BLEPs around 15% for the majority of the MCSs.

One of the reasons for these large deviations between the target BLER and the actual outcome is the effectiveness of the turbo codes. That is, the link performance curves are so steep that the small error caused by the quantization leads to a dramatic change in the BLEP. Furthermore, the link performance is not symmetric with respect to the Signal-to-Interference Ratio (SIR) errors because in a linear scale, the BLEP increases more for a negative SIR error than it decreases for a positive SIR error.

As an example contemplate the link performance curves of two MCSs, corresponding to transport block sizes of 12048 and 15967 bits, respectively. Referring to FIG. 4 the first MCS has an average BLEP of 15%, whereas the second has an average BLEP of 7%. To ease comparison of the link performance of the two MCSs, the curve corresponding to the largest transport block has been translated 3.5 dB. The result is shown in FIG. 5.

Figure 5:
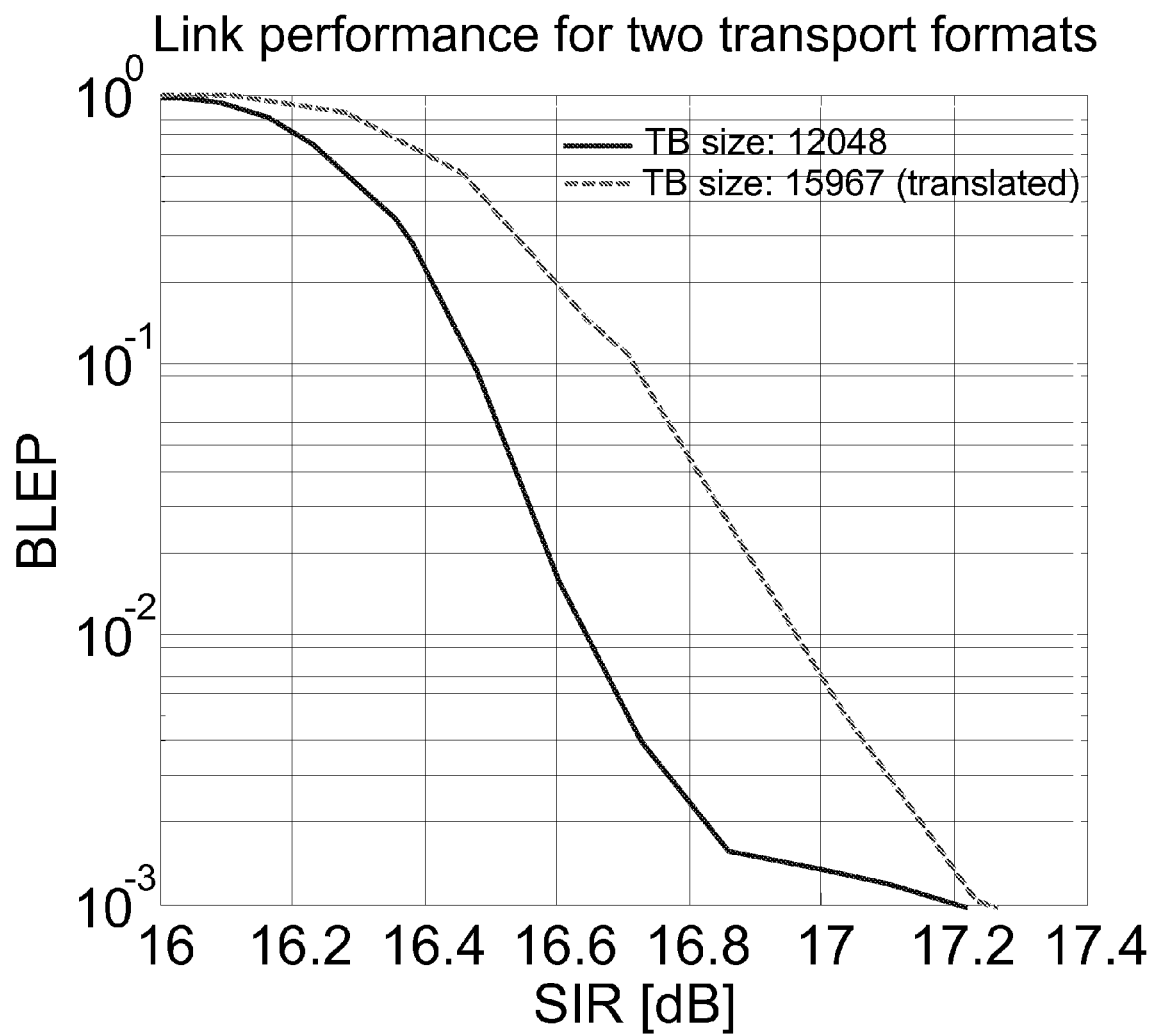
FIG. 5 is a view of the resulting BLEP for a fourth transmission scenario.

From FIG. 5 it can be seen that the two MCSs require 16.65 and 16.95 dB, respectively to achieve 1% BLEP. However, the BLEP increases rapidly as the SIR is decreased: with only 0.25 dB less SIR, the BLEP increases to 20% and 10%. respectively. From these observations. it is fair to conclude that the average BLEP for the second MCS is less sensitive to errors in the SIR, because the curve is slightly less steep.

From the above examples described in conjunction with FIGS. 2-5, one conclusion is that the BLEP prediction does not work as intended. Although the CQI reports provide unbiased estimates of the channel quality at the transmission instant, the resulting average BLEP will differ from the BLEP predicted from the CQI report. Thus, due to the shortcomings of the BLEP prediction, the performance of the link adaptation will deteriorate, causing throughput degradation.

To maintain the resulting average BLEP at the desired level. i.e. close to the BLER target, an adjusted channel quality value, such as a CQI value, is generated by the transmitter. The adjusted channel quality value is then used as an input for selecting the Modulation and Coding Scheme to be used for transmission to the intended receiver.

In accordance with one embodiment of the present invention an offset based on the distribution of the channel quality values is applied to the channel quality value used. For example if CQI reports are used an adjusted CQI value is formed that is based on the distribution of the CQI reports. The offset can in accordance with one embodiment be constant but may also be set as a dynamic offset. In a typically scenario the introduction of an offset reduces the BLEP for all transmissions.

In accordance with another embodiment the currently observed average BLEP can be used as an input parameter when estimating the distribution of channel quality values.

Figure 6:
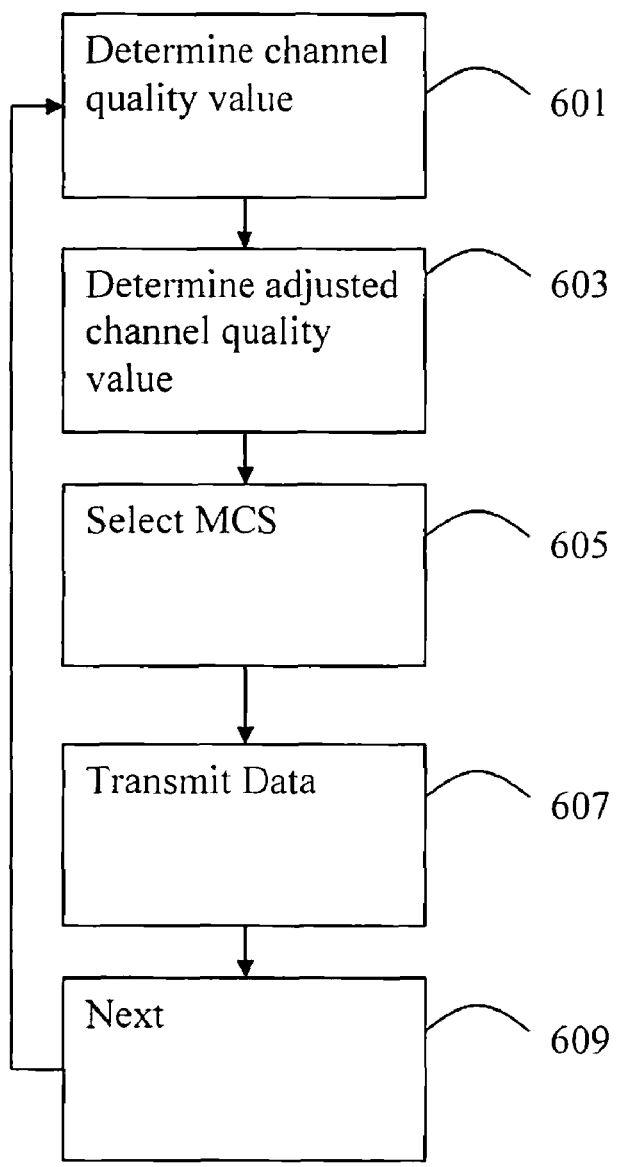
FIG. 6 is a flowchart illustrating steps performed when selecting modulation and coding scheme.

In FIG. 6 a flowchart illustrating steps performed in a transmitter when selecting Modulation and Coding Scheme is shown. First, in a step 601, the transmitter determines an estimated channel quality value, such as a CQI value. The estimated channel quality value can either be based on actual reports, such as CQI reports, received from a receiver or based on estimated directly at the transmitter, based on the quality of the transmissions received from the intended receiver or in some other suitable manner. Next in a step 603 an adjusted channel quality value is determined based on the distribution of the estimated channel quality value. The adjusted channel quality value can be calculated using any of the methods described hereinabove such as by applying a constant offset or by applying a dynamic offset based on for example CQI statistics. Thereupon, in a step 605, a suitable Modulation and Coding Scheme is selected based on the adjusted channel quality value. Then, in a step 607, data is transmitted to the intended receiver using the selected transmission scheme. Finally, in a step 609, the procedure is repeated for the next generated channel quality value and the procedure returns to step 601.

The procedure as described in conjunction with FIG. 6 can advantageously be software implemented by a computer program product 109 loadable into the modulation and coding selection unit 107 of the transmitter 101, which unit 107 then can execute the program stored on the computer program product 109 thereby providing a more efficient transmitter.

Figure 7:
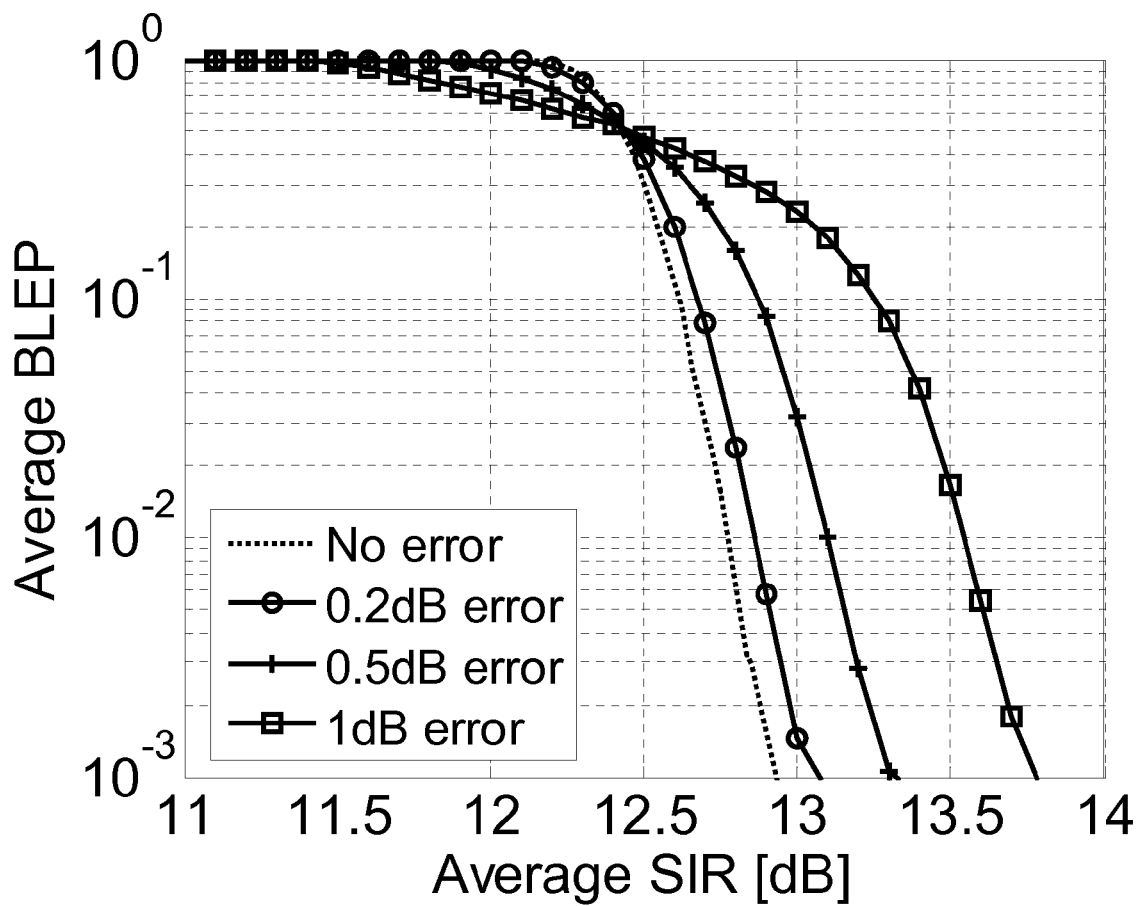
FIG. 7 illustrates a graph of average SIR versus average block-error probability according a method of the disclosure.

Hence, the MCS is selected using a method where the channel quality value is mapped onto the BLEP and where the channel quality value is treated as being associated with an error. This is illustrated in FIG. 7.

Using the modulation and coding scheme selection method as described hereinabove will provide an improved selection of modulation and coding scheme whereby the resulting Block error rate will better correspond to the block error probability which the transmitter aims at reaching. By achieving a better correspondence between actual block error probability and actual block error probability the transmitter can be used more efficiently and fewer resources are needed to transmit data from the transmitter to an intended receiver.

The invention claimed is:

1. A method of selecting a modulation and coding scheme for data to be transmitted from a transmitter to a receiver, where the modulation and coding scheme is based on a value representing a quality of a channel used for transmission of data from the transmitter to the receiver, the method comprising:
   determining a sequence of estimated channel quality values based on digital representations of a corresponding sequence of channel quality measurements,
   adjusting one of the estimated channel quality values to generate an adjusted channel quality value based on a quantization error from the digital representation of the corresponding one of the channel quality measurements and a distribution of adjacent ones of the sequence of channel quality measurements, and
   selecting the modulation and coding scheme based on the adjusted channel quality value.

2. The method according to claim 1, wherein:
   the estimated channel quality value is determined based on channel quality index (CQI) reports received from the receiver, each CQI report including a channel quality value that has the quantization error in its digital representation of a corresponding channel quality measurement by the receiver.

3. The method according to claim 1, where the adjusted channel quality value is generated by adding a dynamically updated value to the estimated channel quality value, wherein the dynamically updated value is determined based on the distribution of a sequence of channel quality values received by the transmitter in channel quality index reports from the receiver.

4. The method according to claim 1, where the adjusted channel quality value is further generated based on a plurality of previously determined Block Error Probabilities (BLEP).

5. A transmitter for transmitting data to a receiver, the transmitter comprising;
   means for determining a sequence of estimated channel quality values based on digital representations of a corresponding sequence of channel quality measurements, and
   means for adjusting one of the estimated channel quality value to generate an adjusted channel quality value based on a quantization error from the digital representation of the corresponding one of the channel quality measurements and a distribution of adjacent ones of the sequence of channel quality measurements,
   means for selecting a modulation and coding scheme for the data to be transmitted based on the adjusted channel quality value representing a quality of a channel used for transmission of data from the transmitter to the receiver.

6. The transmitter according to claim 5, wherein:
   the estimated channel quality value is determined based on channel quality index (CQI) reports received from the receiver, each CQI report including a channel quality value that has the quantization error in its digital representation of a corresponding channel quality measurement by the receiver.

7. The transmitter according to claim 5, where the adjusted channel quality value is generated by adding a dynamically updated value to the estimated channel quality value, wherein the dynamically updated value is determined based on the distribution of a sequence of channel quality values received by the transmitter in channel quality index reports from the receiver.

8. The transmitter according to claim 5, further comprising:
   means for generating the adjusted channel quality value based on a plurality of previously determined Block Error Probabilities (BLEP).

9. A computer program product comprising a computer program segment in a non-transitory computer readable medium that when executed on a computer, causes the computer to perform a method of selecting a modulation and coding scheme for data to be transmitted from a transmitter to a receiver, the method comprising:
   determining a sequence of estimated channel quality values based on digital representations of a corresponding sequence of channel quality measurements;
   adjusting one of the estimated channel quality value to generate an adjusted channel quality value based on a quantization error from the digital representation of the corresponding one of the channel quality measurements and a distribution of adjacent ones of the sequence of channel quality measurements; and
   selecting the modulation and coding scheme based on the adjusted channel quality value.

10. The computer program product of claim 9, where in:
    the estimated channel quality value is determined based on channel quality index (CQI) reports received from the receiver, each CQI report including a channel quality value that has the quantization error in its digital representation of a corresponding channel quality measurement by the receiver.

11. The computer program product of claim 9, where the adjusted channel quality value is generated by adding a dynamically updated value to the estimated channel quality value, wherein the dynamically updated value is determined based on the distribution of a sequence of channel quality values received by the transmitter in channel quality index reports from the receiver.

* * * * *